United States Patent Office 3,021,297
Patented Feb. 13, 1962

3,021,297
POLYSILOXANE RESINS
Philip Donald George, Schenectady, N.Y., assignor to General Electric Company, a corporation of New York
No Drawing. Filed Jan. 21, 1960, Ser. No. 3,735
7 Claims. (Cl. 260—37)

This invention is concerned with air drying methylpolysiloxanes and, more particularly, it is concerned with an air drying methylpolysiloxane obtained by condensing monochloromethylheptamethylcyclotetrasiloxane under anaerobic conditions (i.e., in an oxygen-free atmosphere) in the presence of catalytic amounts of anhydrous ferric chloride.

Usual organopolysiloxanes require elevated temperatures and catalyst in order to effect curing of the organopolysiloxanes. Thus, generally speaking, silicone rubbers require temperatures of from 125–175° C. for times ranging from about 20 minutes to an hour in the presence of sizable amounts of a catalyst such as benzoyl peroxide, in order to effect cure of the convertible organopolysiloxane gums either in the filled or unfilled state. There are many applications where the use of heat to effect curing is not practical nor desirable. Thus, it is often desirable to use silicone rubber formulations as calking compounds but due to the fact that heat is ordinarily required for effecting a cure of the calking compound, there are many places where the use of silicones, particularly silicone rubber for this application, has not been successfully used.

Unexpectedly I have found that by the treatment of a special methylpolysiloxane under a certain set of conditions, I am able to obtain a methylpolysiloxane which can be converted to the polymerized cured state by merely exposing it to air. The composition can be maintained in the substantially non-cross-linked state by excluding air from the composition obtained, for instance, by maintaining it in a closed vessel at room temperature and even after long periods of time, it will be found that the polymer composition is relatively unchanged in viscosity or other physical characteristics.

The chloromethylheptamethylcyclotetrasiloxane with which the present invention is concerned has the formula

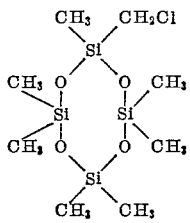

In preparing the air drying composition of the present invention, the chloromethylheptamethylcyclotetrasiloxane is intimately combined with from about 0.001 to about 0.5 percent, by weight, thereof, of anhydrous ferric chloride, and then allowing the siloxane and the ferric chloride to remain in contact with each other at temperatures as low as 20° C. to as high as 75° C. for times ranging from about 1 hour to several days or more, depending on the temperature at which the reaction is being conducted. Increasing the temperature and increasing the catalyst concentration will, of course, accelerate the rate of polymerization to the air drying state. The important thing during this reaction is that air is excluded while the polymerization reaction is taking place. This can be accomplished by maintaining a blanket of nitrogen or other inert atmosphere over the reactants.

In order that those skilled in the art may better understand how the present invention may be practiced, the following examples are given by way of illustration and not by way of limitation. All parts are by weight.

Example 1

One hundred parts of freshly distilled chloromethylheptamethylcyclotetrasiloxane (prepared for instance, by the process described in U.S. Patent 2,513,924, issued July 4, 1950) was mixed with about 0.01 percent, by weight, thereof, anhydrous ferric chloride and the mixture of ingredients placed in a closed jar from which air was excluded at a temperature of about 27–29° C. for approximately 300 hours. At the end of this time, there was obtained a clear, flowable, benzene-soluble gum which when it was allowed to stand exposed to air set up to a tough elastic film.

When the above procedure was repeated with the same ingredients as above, but in the presence of air, a flowable benzene-soluble gum was obtained which changed little when exposed to air.

Example 2

A filled rubber was made from 100 parts of the anaerobically polymerized chloromethylheptamethylcyclotetrasiloxane obtained in Example 1, 40 parts silica aerogel, and about 1.65 parts benzoyl peroxide. This mixture of ingredients was pressed for 20 minutes at 125° C., to yield a sheet having a tensile strength of about 800 p.s.i., an elongation of 500 percent, and a tear strength of about 89. These physical properties unexpectedly compared quite favorably with the properties of a cured polydimethylsiloxane made by first condensing octamethylcyclotetrasiloxane with KOH and thereafter mixing the polymer thus obtained with silica aerogel and benzoyl peroxide in the same proportions as above.

The polymerized product obtained in Example 1, either with or without a filler, can be used for calking compounds and can be injected by means of a calking gun into areas where it is desired to have a silicone rubber coating or seal so as to take advantage of the heat resistance characteristics of silicone rubber or its low temperature characteristics of being resistant to hardening and shattering at low temperatures at which silicone rubber is normally useful. The calking compound can then be allowed to remain exposed to the air and after a period of several hours will begin to harden and cure so that an in situ curing of the calking compound will take place to give a tight adherent seal.

In addition to the fillers described above, other fillers may be incorporated in amounts ranging from about 5 percent to about 200 percent or more, by weight, based on the weight of the polymerized cyclotetrasiloxane as, for instance, fume silica, precipitated silica, titanium dioxide, zinc oxide, gamma alumina, etc. When making formulations to be molded at elevated temperatures and pressures, it will be apparent to those skilled in the art that catalysts may be employed in addition to benzoyl peroxide, as, for instance, tertiarybutylperbenzoate, dicumyl peroxide, etc., employing these curing agents in amounts ranging from about 1.25 to 5 percent, by weight, or more based on the weight of the polymerized cyclotetrasiloxane.

The presence of the carbon-bonded chlorine on the polymer obtained from the polymerization of the chloromethylheptamethylcyclotetrasiloxane offers a reactive site and thus an additional functionality in the polymerized product. Advantage of this functionality can be taken by incorporating with the polymerized composition derived from the chloromethylheptamethylcyclotetrasiloxane small amounts, for instance, from about 0.1 to 10 percent, by weight, of the polymerized product, of a metal oxide such as lead oxide or zinc oxide. Thus, on a weight basis, 100 parts of the polymerized product described in Example 1 can be mixed with 40 parts silica aerogel, 10 parts zinc oxide, and 1 part beta-phenyl naphthylamine, heated at about 125–150° C. for from 10–20 minutes to yield a cured or vulcanized polymer without requiring the presence of any peroxide curing agent.

What I claim as new and desire to secure by Letters Patent of the United States is:

1. The process for making an air drying methylpolysiloxane which comprises contacting chloromethylheptamethylcyclotetrasiloxane with a catalytic amount of anhydrous ferric chloride under anaerobic conditions.

2. The process of claim 1 in which there is employed from about 0.001 to 0.5 percent, by weight, anhydrous ferric chloride.

3. The process for making an air-drying methylpolysiloxane which comprises contacting chloromethylheptamethylcyclotetrasiloxane with from about 0.001 to 0.5 percent, by weight, thereof anhydrous ferric chloride in the substantial absence of air, and allowing the reactants to remain in contact with each other for a time sufficient to effect conversion of the chloromethylheptamethylcyclotetrasiloxane to the polymerized state.

4. An air drying composition obtained in accordance with the process of claim 1.

5. An air drying composition obtained in accordance with the process of claim 1 wherein there is also incorporated after polymerization a finely divided filler.

6. A composition of matter comprising (1) an air-drying methylpolysiloxane obtained by contacting chloromethylheptamethylcyclotetrasiloxane with from about 0.001 to 0.5 percent, by weight, thereof anhydrous ferric chloride under anaerobic conditions, (2) a filler, and (3) an organic peroxide curing agent for the product of (1).

7. A composition of matter comprising (1) an air-drying methylpolysiloxane obtained by contacting a chloromethylheptamethylcyclotetrasiloxane with from about 0.001 to 0.5 percent, by weight, thereof anhydrous ferric chloride under anaerobic conditions, (2) a finely divided silica filler, and (3) a catalytic amount of benzoyl peroxide.

References Cited in the file of this patent

UNITED STATES PATENTS 2,803,617    Corrin    Aug. 20, 1957

FOREIGN PATENTS 682,541    Great Britain    Nov. 12, 1952
773,324    Great Britain    Apr. 24, 1957